United States Patent
Fein et al.

(10) Patent No.: US 8,356,078 B2
(45) Date of Patent: Jan. 15, 2013

(54) MULTI-HOMED DATA FORWARDING STORAGE

(75) Inventors: Gene Fein, Malibu, CA (US); Edward Merritt, Lenox, MA (US)

(73) Assignee: Tajitshu Transfer Limited Liability Company, Wilmington, DE (US)

( * ) Notice: Subject to any disclaimer, the term of this patent is extended or adjusted under 35 U.S.C. 154(b) by 169 days.

(21) Appl. No.: 13/057,072

(22) PCT Filed: Jul. 9, 2009

(86) PCT No.: PCT/US2009/050008
§ 371 (c)(1),
(2), (4) Date: Feb. 1, 2011

(87) PCT Pub. No.: WO2010/014368
PCT Pub. Date: Feb. 4, 2010

(65) Prior Publication Data
US 2011/0138075 A1    Jun. 9, 2011

Related U.S. Application Data

(63) Continuation of application No. 12/184,866, filed on Aug. 1, 2008, now Pat. No. 7,599,997.

(51) Int. Cl.
*G06F 15/167* (2006.01)
*G06F 15/16* (2006.01)

(52) U.S. Cl. ....................... 709/212; 709/206

(58) Field of Classification Search .................. 709/206, 709/212
See application file for complete search history.

(56) References Cited

U.S. PATENT DOCUMENTS

| | | |
|---|---|---|
| 3,786,424 A | 1/1974 | McVoy et al. |
| 5,751,928 A | 5/1998 | Bakalash |
| 5,787,258 A | 7/1998 | Costa et al. |
| 5,978,839 A | 11/1999 | Okuhara et al. |
| 6,085,030 A | 7/2000 | Whitehead et al. |

(Continued)

FOREIGN PATENT DOCUMENTS

EP    0 458 567    5/1991
(Continued)

OTHER PUBLICATIONS

EPO, Extended Search Report re EPO App. No. 09734559.9, dated Jul. 25, 2011.

(Continued)

*Primary Examiner* — Jerry Dennison
(74) *Attorney, Agent, or Firm* — Knobbe, Martens, Olson & Bear LLP

(57) ABSTRACT

Methods and apparatus, including computer program products, for multi-homed data forwarding storage. A method includes, in a computer system having multiple non-loopback network addresses, receiving a request to store data, directing the data to a memory location associated with a first non-loopback network address available to receive the data, continuously forwarding the data from the memory location associated with the first non-loopback network address to a memory location associated with another non-loopback network address in the computer system without storing on any physical storage device in the computer system. The continuously forwarding can include detecting a presence of the data in a memory location associated with a specific non-loopback network address, and forwarding the data to another memory location of another non-loopback network address in the computer without storing on any physical storage device.

20 Claims, 6 Drawing Sheets

U.S. PATENT DOCUMENTS

| | | | |
|---|---|---|---|
| 6,151,395 A | 11/2000 | Harkins | |
| 6,205,478 B1 | 3/2001 | Sugano et al. | |
| 6,219,691 B1 * | 4/2001 | Youn | 709/200 |
| 6,260,159 B1 | 7/2001 | Garnett et al. | |
| 6,298,380 B1 | 10/2001 | Coile et al. | |
| 6,505,213 B1 | 1/2003 | Kamada et al. | |
| 6,549,957 B1 | 4/2003 | Hanson et al. | |
| 6,587,866 B1 | 7/2003 | Modi et al. | |
| 6,650,640 B1 | 11/2003 | Muller et al. | |
| 6,677,976 B2 | 1/2004 | Parker et al. | |
| 6,684,258 B1 | 1/2004 | Gavin et al. | |
| 6,721,275 B1 | 4/2004 | Rodeheffer et al. | |
| 6,724,767 B1 | 4/2004 | Chong et al. | |
| 6,745,289 B2 | 6/2004 | Gruner et al. | |
| 6,907,447 B1 | 6/2005 | Cooperman et al. | |
| 6,941,338 B1 | 9/2005 | Madsen | |
| 6,983,303 B2 | 1/2006 | Pellegrino et al. | |
| 6,985,476 B1 | 1/2006 | Elliott et al. | |
| 7,007,142 B2 | 2/2006 | Smith | |
| 7,035,933 B2 | 4/2006 | O'Neal et al. | |
| 7,043,530 B2 | 5/2006 | Isaacs et al. | |
| 7,061,923 B2 | 6/2006 | Dugan et al. | |
| 7,103,824 B2 | 9/2006 | Halford | |
| 7,120,631 B1 | 10/2006 | Vahalia et al. | |
| 7,136,638 B2 | 11/2006 | Wacker et al. | |
| 7,143,170 B2 | 11/2006 | Swildens et al. | |
| 7,191,298 B2 | 3/2007 | Kaminsky et al. | |
| 7,197,576 B1 | 3/2007 | Lo et al. | |
| 7,209,973 B2 | 4/2007 | Tormasov et al. | |
| 7,240,214 B2 | 7/2007 | Gazzetta et al. | |
| 7,266,776 B2 | 9/2007 | Quillen et al. | |
| 7,274,706 B1 | 9/2007 | Nguyen et al. | |
| 7,277,941 B2 | 10/2007 | Ignatius et al. | |
| 7,295,556 B2 | 11/2007 | Roese et al. | |
| 7,320,059 B1 | 1/2008 | Armangau et al. | |
| 7,327,731 B1 | 2/2008 | Kumar et al. | |
| 7,346,063 B1 | 3/2008 | Herbst | |
| 7,346,909 B1 | 3/2008 | Eldar et al. | |
| 7,356,540 B2 | 4/2008 | Smith et al. | |
| 7,356,567 B2 | 4/2008 | Odell et al. | |
| 7,363,316 B2 | 4/2008 | Anderson et al. | |
| 7,366,868 B2 | 4/2008 | Reuter et al. | |
| 7,404,002 B1 | 7/2008 | Pereira | |
| 7,424,514 B2 | 9/2008 | Noble et al. | |
| 7,426,471 B1 | 9/2008 | Briscoe et al. | |
| 7,426,574 B2 | 9/2008 | Liao | |
| 7,426,637 B2 | 9/2008 | Risan et al. | |
| 7,426,745 B2 | 9/2008 | McCarty | |
| 7,428,219 B2 | 9/2008 | Khosravi | |
| 7,428,540 B1 | 9/2008 | Coates et al. | |
| 7,430,584 B1 | 9/2008 | Fein et al. | |
| 7,529,784 B2 | 5/2009 | Kavuri et al. | |
| 7,599,997 B1 | 10/2009 | Fein et al. | |
| 7,631,051 B1 | 12/2009 | Fein et al. | |
| 7,631,052 B2 | 12/2009 | Fein et al. | |
| 7,636,758 B1 | 12/2009 | Fein et al. | |
| 7,636,759 B1 | 12/2009 | Fein et al. | |
| 7,636,760 B1 | 12/2009 | Fein et al. | |
| 7,636,761 B1 | 12/2009 | Fein et al. | |
| 7,636,762 B1 | 12/2009 | Fein et al. | |
| 7,636,763 B1 | 12/2009 | Fein et al. | |
| 7,636,764 B1 | 12/2009 | Fein et al. | |
| 7,668,926 B2 | 2/2010 | Fein et al. | |
| 7,668,927 B2 | 2/2010 | Fein et al. | |
| 7,673,009 B2 | 3/2010 | Fein et al. | |
| 7,685,248 B1 | 3/2010 | Fein et al. | |
| 7,844,695 B2 | 11/2010 | Fein et al. | |
| 7,877,456 B2 | 1/2011 | Fein et al. | |
| 7,924,888 B2 | 4/2011 | Schultze et al. | |
| 2002/0158899 A1 | 10/2002 | Raymond | |
| 2002/0194371 A1 | 12/2002 | Kadoi | |
| 2003/0093463 A1 * | 5/2003 | Graf | 709/203 |
| 2003/0101200 A1 | 5/2003 | Koyama et al. | |
| 2003/0137880 A1 | 7/2003 | Barrenscheen et al. | |
| 2003/0158958 A1 | 8/2003 | Chiu | |
| 2004/0064633 A1 | 4/2004 | Oota | |
| 2004/0093390 A1 | 5/2004 | Oberdorfer | |
| 2004/0165525 A1 | 8/2004 | Burak | |
| 2004/0223503 A1 | 11/2004 | Lynch et al. | |
| 2004/0250029 A1 | 12/2004 | Ji et al. | |
| 2005/0010647 A1 | 1/2005 | Durham | |
| 2005/0010685 A1 * | 1/2005 | Ramnath et al. | 709/238 |
| 2005/0015466 A1 | 1/2005 | Tripp | |
| 2005/0044162 A1 | 2/2005 | Liang et al. | |
| 2005/0071568 A1 | 3/2005 | Yamamoto et al. | |
| 2005/0201409 A1 | 9/2005 | Griswold et al. | |
| 2005/0216473 A1 | 9/2005 | Aoyagi | |
| 2005/0216727 A1 | 9/2005 | Chattopadhyay et al. | |
| 2005/0240749 A1 | 10/2005 | Clemo et al. | |
| 2005/0243823 A1 | 11/2005 | Griswold et al. | |
| 2006/0031593 A1 | 2/2006 | Sinclair | |
| 2006/0091007 A1 | 5/2006 | Inoue et al. | |
| 2006/0095512 A1 | 5/2006 | Noma | |
| 2006/0143505 A1 | 6/2006 | Olarig | |
| 2006/0159456 A1 | 7/2006 | Gumaste et al. | |
| 2006/0209822 A1 | 9/2006 | Hamamoto et al. | |
| 2006/0212551 A1 | 9/2006 | Kao et al. | |
| 2006/0242212 A1 | 10/2006 | Brinkmann et al. | |
| 2007/0005694 A1 | 1/2007 | Popkin et al. | |
| 2007/0011097 A1 | 1/2007 | Eckleder | |
| 2007/0050446 A1 | 3/2007 | Moore | |
| 2007/0050761 A1 | 3/2007 | Hester et al. | |
| 2007/0055765 A1 | 3/2007 | Lisiecki et al. | |
| 2007/0058606 A1 | 3/2007 | Koskelainen | |
| 2007/0073965 A1 | 3/2007 | Rajakarunanayake | |
| 2007/0079087 A1 | 4/2007 | Wang et al. | |
| 2007/0186068 A1 | 8/2007 | Agrawal | |
| 2007/0195772 A1 | 8/2007 | Shadish | |
| 2007/0214105 A1 | 9/2007 | Sfarti et al. | |
| 2007/0266220 A1 | 11/2007 | Nelson | |
| 2007/0271349 A1 | 11/2007 | Clemo et al. | |
| 2008/0013448 A1 | 1/2008 | Horie et al. | |
| 2008/0016564 A1 | 1/2008 | Claudatos et al. | |
| 2008/0037777 A1 | 2/2008 | Ignatius et al. | |
| 2008/0059495 A1 | 3/2008 | Kiessig et al. | |
| 2008/0071855 A1 | 3/2008 | Farber et al. | |
| 2008/0084330 A1 | 4/2008 | Picard | |
| 2008/0091744 A1 | 4/2008 | Shitomi et al. | |
| 2008/0095075 A1 | 4/2008 | Monier | |
| 2008/0101277 A1 | 5/2008 | Taylor et al. | |
| 2008/0104085 A1 | 5/2008 | Papoutsakis et al. | |
| 2008/0114891 A1 | 5/2008 | Pereira | |
| 2008/0144655 A1 | 6/2008 | Beam et al. | |
| 2008/0151893 A1 | 6/2008 | Nordmark et al. | |
| 2008/0155094 A1 | 6/2008 | Roese et al. | |
| 2008/0155252 A1 | 6/2008 | Nambiar | |
| 2008/0155275 A1 | 6/2008 | Natarajan et al. | |
| 2008/0155537 A1 | 6/2008 | Dinda et al. | |
| 2008/0181224 A1 | 7/2008 | Van Hensbergen et al. | |
| 2008/0222415 A1 | 9/2008 | Munger et al. | |
| 2008/0222492 A1 | 9/2008 | Earhart et al. | |
| 2008/0225842 A1 | 9/2008 | Goldfein et al. | |
| 2008/0225888 A1 | 9/2008 | Valluri et al. | |
| 2008/0228943 A1 | 9/2008 | Balus et al. | |
| 2008/0313318 A1 | 12/2008 | Vermeulen et al. | |
| 2009/0006808 A1 | 1/2009 | Blumrich et al. | |
| 2009/0063419 A1 | 3/2009 | Nurminen et al. | |
| 2009/0067322 A1 | 3/2009 | Shand et al. | |
| 2009/0092124 A1 | 4/2009 | Singhal et al. | |
| 2009/0141621 A1 | 6/2009 | Fan et al. | |
| 2009/0204320 A1 * | 8/2009 | Shaffer et al. | 701/202 |
| 2009/0234933 A1 | 9/2009 | Fein et al. | |
| 2009/0238167 A1 | 9/2009 | Fein et al. | |
| 2009/0254567 A1 | 10/2009 | Fein et al. | |
| 2009/0300635 A1 | 12/2009 | Ferris | |
| 2010/0185581 A1 | 7/2010 | Bakalash | |
| 2011/0125721 A1 | 5/2011 | Fein et al. | |
| 2011/0138075 A1 | 6/2011 | Fein et al. | |
| 2011/0167131 A1 | 7/2011 | Fein | |
| 2011/0179131 A1 | 7/2011 | Fein | |

FOREIGN PATENT DOCUMENTS

| | | |
|---|---|---|
| EP | 0 722 591 | 6/1999 |
| EP | 1 048 998 | 11/2000 |
| EP | 1 968 257 | 9/2003 |
| EP | 1 357 476 A | 10/2003 |
| EP | 1406446 A1 | 4/2004 |

| | | |
|---|---|---|
| EP | 1 802 051 | 11/2006 |
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-116144 | 9/1981 |
| JP | 56-116145 | 9/1981 |
| JP | 61-165889 | 7/1986 |
| JP | 06-068047 | 3/1994 |
| JP | 10-254761 | 9/1998 |
| JP | 11-065911 | 3/1999 |
| JP | 2002-268952 | 9/2002 |
| JP | 2003-296176 | 10/2003 |
| JP | 2003-296179 | 10/2003 |
| JP | 2005-070987 | 3/2005 |
| JP | 2005-216241 | 8/2005 |
| JP | 2005-310126 | 11/2005 |
| JP | 2005-339325 | 12/2005 |
| JP | 2007-310673 | 11/2007 |
| JP | 2008-052340 | 3/2008 |
| JP | 2011-519097 | 6/2011 |
| WO | WO 94/04991 | 3/1994 |
| WO | WO 01/67303 | 9/2001 |
| WO | WO 02/052417 | 7/2002 |
| WO | WO 2004/059529 | 7/2004 |
| WO | WO 2005/062578 | 7/2005 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2009/021289 | 2/2007 |
| WO | WO 2007/031593 | 3/2007 |
| WO | WO 2008/006079 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

Australian Office Action, re AU Application No. 2009-268716, dated Feb. 29, 2012.
Japanese Office Action, re JP Application No. 2011-506496, dated Mar. 21, 2012.
U.S. Notice of Allowance re U.S. Appl. No. 12/052,345, dated Dec. 29, 2011.
Australian Office Action re AU Application No. 2009240392, dated May 1, 2012.
Australian Office Action re AU Application No. 2009268792, dated Jun. 8, 2012.
Australian Office Action, re AU Application No. 2009296496, dated May 23, 2012.
Japanese Office Action (Notice of Rejection), re JP Application No. JP 2011-500858, dated May 29, 2012.
Japanese Office Action re JP Application No. JP 2011-521163, dated May 23, 2012.
Korean Office Action, re KR Application No. Oct. 2011-7000703, dated Jul. 16, 2012.
Wojciech Purczynski et al.: "Juggling with packets: floating data storage," Internet Archive, Oct. 2003. [retrieved on Apr. 25, 2012].
Retrieved from the Internet<URL: http://web.archive.org/web/20031017082346/http://lcamtuf.coredump.cx/juggling_with_packets.txt.
Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.
Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2 . . . Jun. 18, 2010.
Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
EPO Exam Report re App. No. 09723251.6, dated Nov. 11, 2010.
Ertaul et al.: "ECC Based Threshold Cryptography for Secure Data Forwarding and Secure Key Exchange in MANET (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hoke, et al.: "InteMon: Continuous Mining of Sensor Data in Large-scale Self-* Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al. "Technologies of ETERNUSVS900 Storage Virtualization Switch", Fujitsu Sci. Tech. J., Jan. 2006, vol. 42, Issue 1, pp. 17-23.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31- Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
PCT International Preliminary Report and Report on Patentability re App. No. PCT/US2009/49763, dated Jan. 20, 2011.
PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.
PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.

PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, mailed on Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.
PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.
PCT International Search Report re App. No. PCT/US2009/58368, dated Oct. 26, 2009.
PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Sharma, et al.: "Data Warehouse and Olap Technology Part-1", power point presentation, first cited on Sep. 29, 2008 in U.S. Appl. No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
U. S. Non-Final Office Action mailed May 14, 2009, re U.S. Appl. No. 12/132,804.
U. S. Notice of Allowance mailed Aug. 7, 2008, re U.S. Appl. No. 12/046,757.
U. S. Notice of Allowance mailed Jul. 15, 2009, re U.S. Appl. No. 12/132,804.
U. S. Notice of Allowance mailed Jul. 26, 2010, re U.S. Appl. No. 12/240,802.
U. S. Notice of Allowance mailed Sep. 15, 2010, re U.S. Appl. No. 12/099,498.
U. S. Office Action re U.S. Appl. No. 12/240,757, dated Jun. 22, 2009.
U.S. Non-Final Office Action mailed Apr. 16, 2010, re U.S. Appl. No. 12/099,498.

Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
Pakkala, D. et al.: "Towards a Peer-to-Peer Extended Content Delivery Network", pp. 1-5, XP002615892, retrieved from the Internet: Url:http://www.eurasip.org/Proceedings/Ext/IST05/papers/99.pdf on Jan. 7, 2011.
Pierre, G. et al.: "Globule: A Collaborative Content Delivery Network", IEEE Communications Magazine, vol. 44, No. 8, Aug. 1, 2006, pp. 127-133.
Tanenbaum, Andrew S.: "Network Protocols", Computing Surveys, vol. 13, No. 4, Dec. 1, 1981, pp. 453-489.
Japanese Office Action, re JP Application No. 2011-504044, dated Sep. 4, 2012.
Japanese Office Action re JP Application No. 2011-529255, dated Apr. 26, 2012.
Japanese Office Action, re JP App. No. 2011-529258, dated Apr. 26, 2012.
Purczynski, et al.: "Juggling with packets: floating data storage," Internet Archive, Oct. 2003. [retrieved on Apr. 25, 2012]. Retrieved from the Internet: <URL: http://web.archive.org/web/20031017082346/http://lcamtuf.coredump.cx/juggling_with_packets.txt>.
European Extended Search Report, re EP Application No. 09795041, dated Oct. 11, 2011.
Japanese Office Action dated Apr. 13, 2012, re JP App. No. 2011-517515.
U.S. Notice of Allowance re U.S. Appl. No. 12/052,345, dated Apr. 2, 2012.
European Extended Search Report, re EP Application No. 09816904.8, dated Feb. 6, 2012.
European Office Action, re EP Application No. 09795041, dated Aug. 9, 2012.
U. S. Interview Summary mailed Aug. 8, 2012, re U.S. Appl. No. 12/989,638.
U. S. Office Action re U.S. Appl. No. 13/003,505, dated Aug. 22, 2012.
U.S. Interview Summary mailed Aug. 6, 2012, re U.S. Appl. No. 12/991,383.
U.S. Interview Summary mailed Aug. 6, 2012, re U.S. Appl. No. 13/119,124.
U.S. Interview Summary mailed Aug. 7, 2012, re U.S. Appl. No. 13/003,502.
U.S. Interview Summary mailed Aug. 7, 2012, re U.S. Appl. No. 13/119,122.
U.S. Interview Summary mailed Aug. 7, 2012, re U.S. Appl. No. 13/119,147.
U.S. Interview Summary re U.S. Appl. No. 13/119,133, dated Aug. 7, 2012.
U.S. Notice of Allowance mailed Aug. 31, 2012, re U.S. Appl. No. 13/119,133.
U.S. Office Action re U.S. Appl. No. 12/052,345, dated Oct. 4, 2011.

* cited by examiner

MULTI-HOMED DATA FORWARDING STORAGE

CROSS REFERENCE TO RELATED APPLICATIONS

This application is a U.S. National Phase of International Application No. PCT/US2009/050008, filed Jul. 9, 2009 which is a continuation of U.S. patent application Ser. No. 12/184,866, filed Aug. 1, 2008, now U.S. Pat. No. 7,599,997, entitled "MULTI-HOMED DATA FORWARDING STORAGE," each of which is hereby expressly incorporated by reference in its entirety.

BACKGROUND

At least some embodiments disclosed herein relate to data storage, and more particularly, to multi-homed data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for multi-homed data forwarding storage.

In general, in one aspect, the invention features a method including, in a computer system having multiple non-loopback network addresses, receiving a request to store data, directing the data to a memory location associated with a first non-loopback network address available to receive the data, continuously forwarding the data from the memory location associated with the first non-loopback network address to a memory location associated with another non-loopback network address in the computer system without storing on any physical storage device in the computer system. The continuously forwarding can include detecting a presence of the data in a memory location associated with a specific non-loopback network address, and forwarding the data to another memory location of another non-loopback network address in the computer without storing on any physical storage device.

In another aspect, the invention features a system including a processor, multiple network interfaces, each of the network interfaces including a unique a non-loopback Internet protocol (IP) address, and a memory including a data forwarding storage process. The data forwarding storage process can include receiving a request to store data, directing the data to a memory location associated with a first non-loopback IP address available to receive the data, continuously forwarding the data from the memory location associated with the first non-loopback IP address to a memory location associated with another non-loopback IP address in the computer system without storing on any physical storage device in the computer system. The continuously forwarding can include detecting a presence of the data in a memory location associated with a specific non-loopback IP address, and forwarding the data to another memory location of another non-loopback IP address in the computer without storing any physical storage device.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
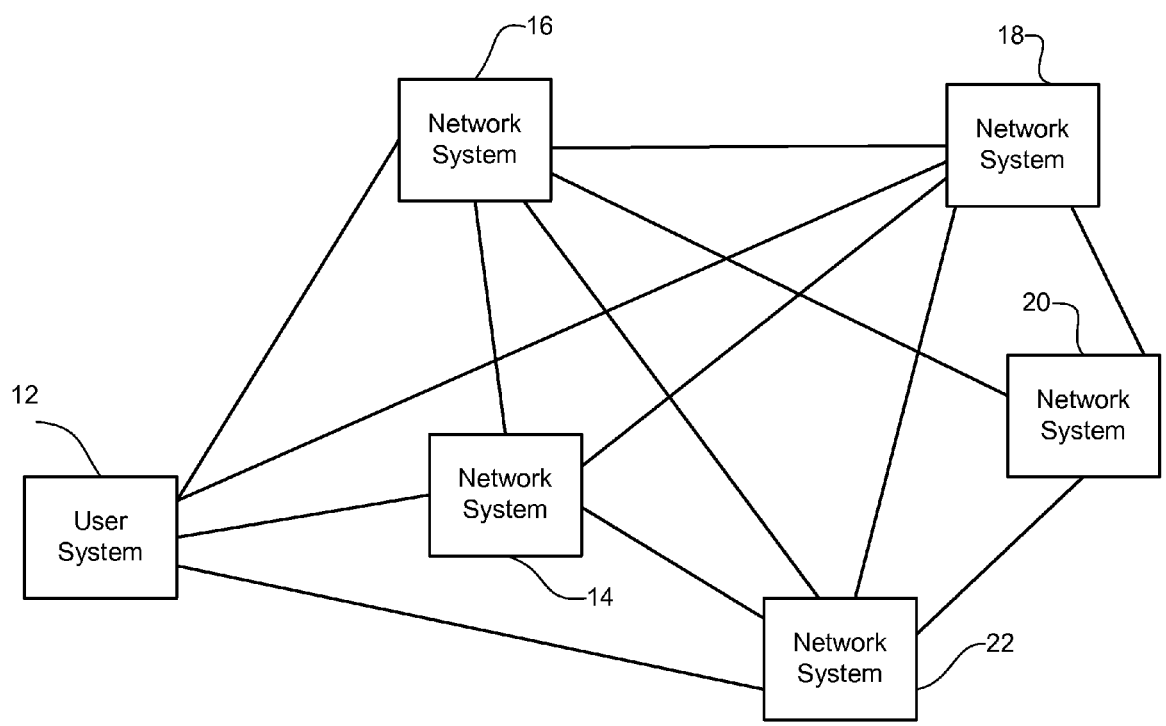
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
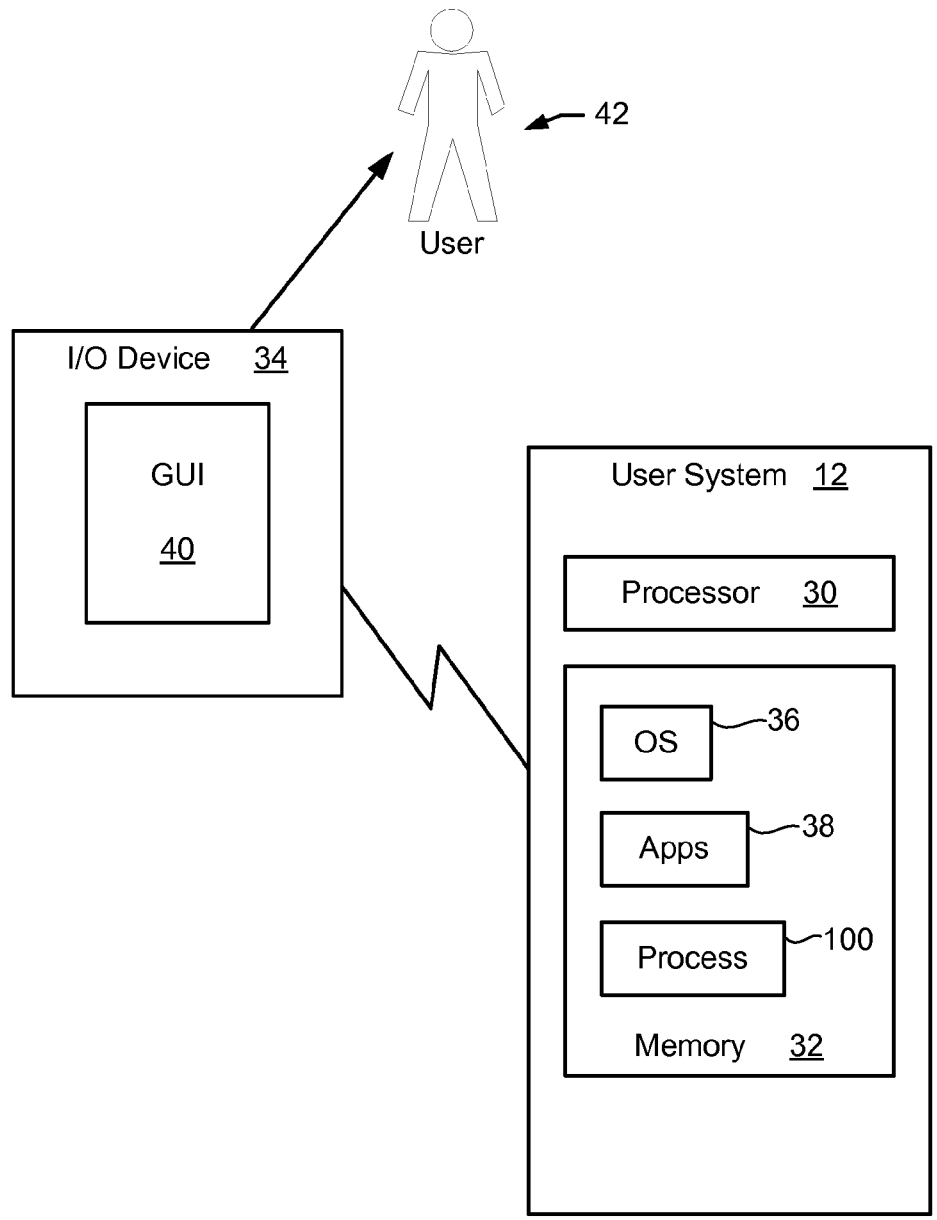
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
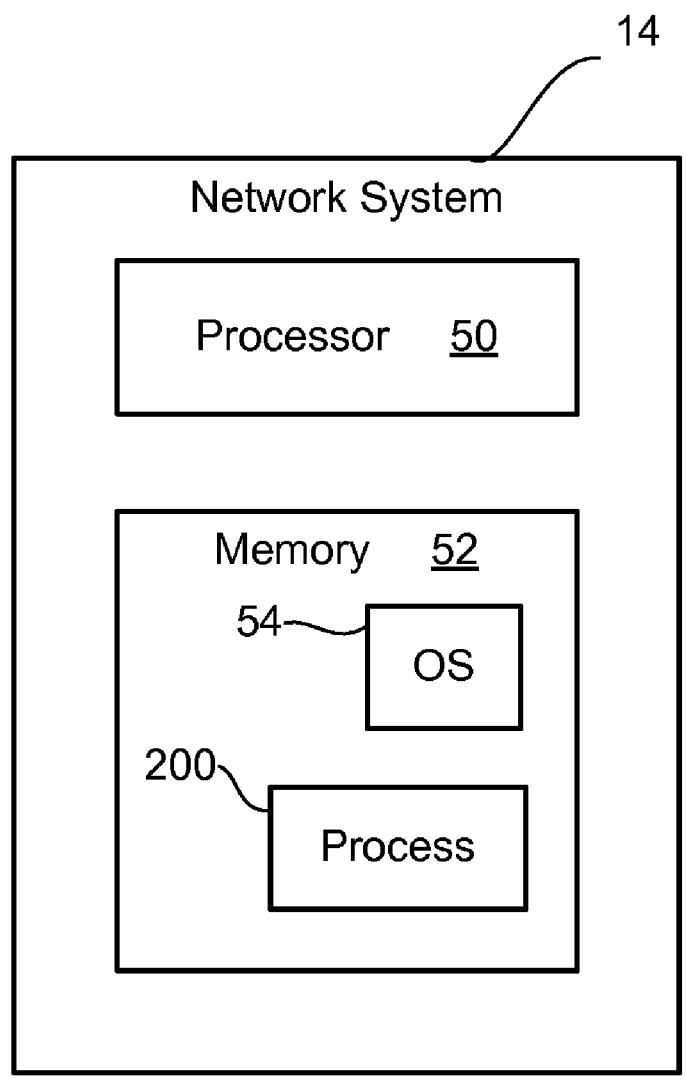
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10 where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node.

In a like manner, when a request to retrieve data is received by the central server 14 from storage process 100, the requested data, which is being forwarded from node memory to node memory in the network 10, is retrieved.

Data forwarded in this manner can be segmented and segments forwarded as described above. Sill, the segmented data is not stored on any physical storage medium in any network node, but merely forwarded from the memory of one node to the memory of another node.

Figure 4:
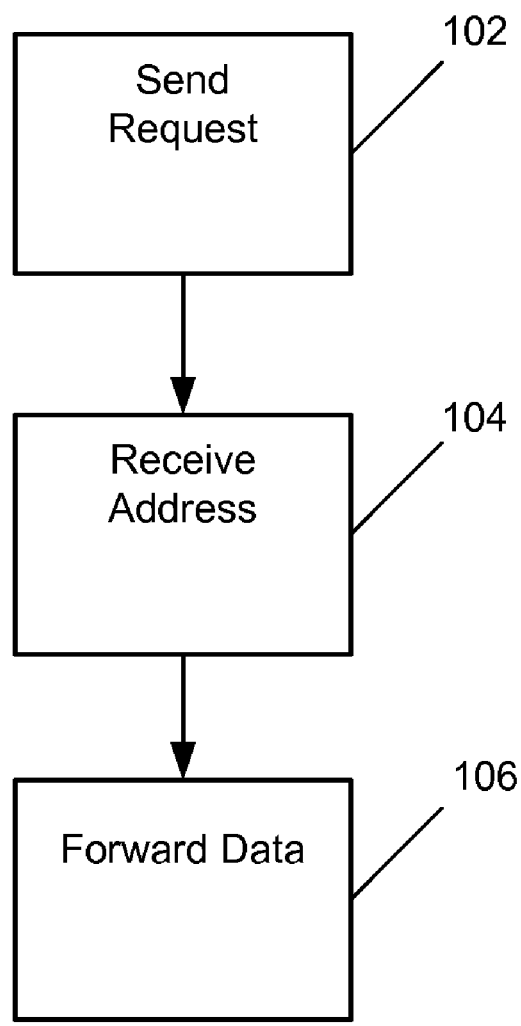
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address.

Figure 5:
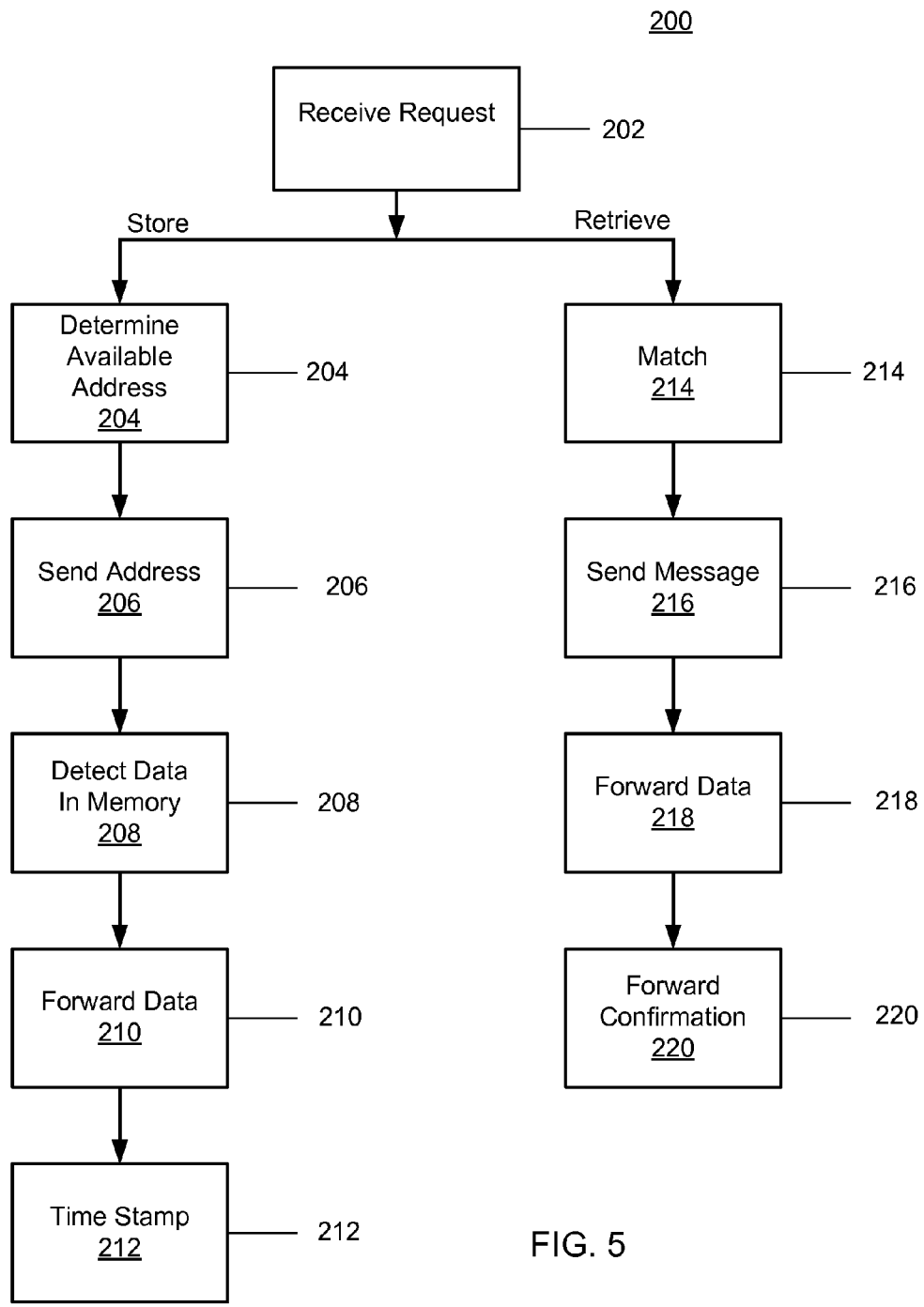
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory. This determination (204) can include pinging the network and determining which of the nodes in a network is available, or determining which node in the network has the least traffic, or determining which node in the network has the largest available memory, or any combination of these or other factors.

Process 200 sends (206) a message to the user system with the address of a specific node for the requester to forward the data.

Process 200 detects (208) the presence of data in node memory. Process 200 forwards (210) the data in memory to another node in the network of nodes and continues to repeat detecting (208) and forwarding (210) of the data from node memory to node memory. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

A node typically has one network interface with one associated network address. However, a node may include multiple network interfaces, each with their own associated non-loopback network address, such as a non-loopback Internet protocol (IP) address. Furthermore, a node may include a network interface with multiple associated non-loopback network addresses, such as multiple non-loopback IP addresses. Such a node is referred to as a "multi-homed node."

For example, the Internet Engineering Task Force (IETF) has developed IP version 6 (IPv6). The hierarchical layers provided by IPv6 may change the way multi-homing devices within a network are perceived. In IPv4, multi-homing is generally perceived as a host or system that uses multiple network interfaces. In contrast, hosts in IPv6 may only have one network interface, but respond to multiple global IPv6 addresses, link-local addresses, and site-local addresses. As a result, almost every host in the IPv6 network can be a multi-homed host.

Process 200 can be modified and enabled within a single computer system that includes multiple IP (IP) addresses (e.g., 2001:db8::1, 2001:db8::2 and 2001:db8::3 in IPv6), but only one physical upstream link. This is sometimes referred to as single link, multiple IP address (spaces) multi-homing.

As described above, a device can be multi-homed (e.g., host-centric multi-homing), when it has more than one interface, and each of the interfaces is attached to different networks (may be within a multi-homed network). In addition, in IPv6, each interface can have multiple addresses, which means than even with a single interface, a host can be multi-homed.

Multi-homing can provide a certain degree of resilience/redundancy against failures (link, hardware, protocols, others) and also enables features such as load balancing. Moreover, multi-homing can be used in order to differentiate traffic based on policy, for non-technical reasons, such as cost associated with different flows, time of the day, and so forth. For highly distributed enterprises, it can also occur as an aid to address that enterprise's geographical distribution, and as a traffic engineering mechanism to improve local performance such as latency and hop count reductions for real time protocols.

With single link, multiple IP address (spaces) multi-homing, a modified process 200 forwards data in memory within a single computer having multiple assigned IP addresses. When the computer is powered-off or experiences a failure, such as loss of power, all data being forwarded in memory is automatically forwarded to a node memory in the network 10, where it is continually routed/forwarded from node memory to node memory in the network 10 according to process 200. When power is restored to the computer, data is recovered/reloaded from the network 10 and then continuously forwarded within the memory of the computer without ever being fixed in physical storage.

Data forwarded from memory location to memory location within a single computer system can also be periodically forwarded to the network 10 to provide backup and redundancy.

Figure 6:
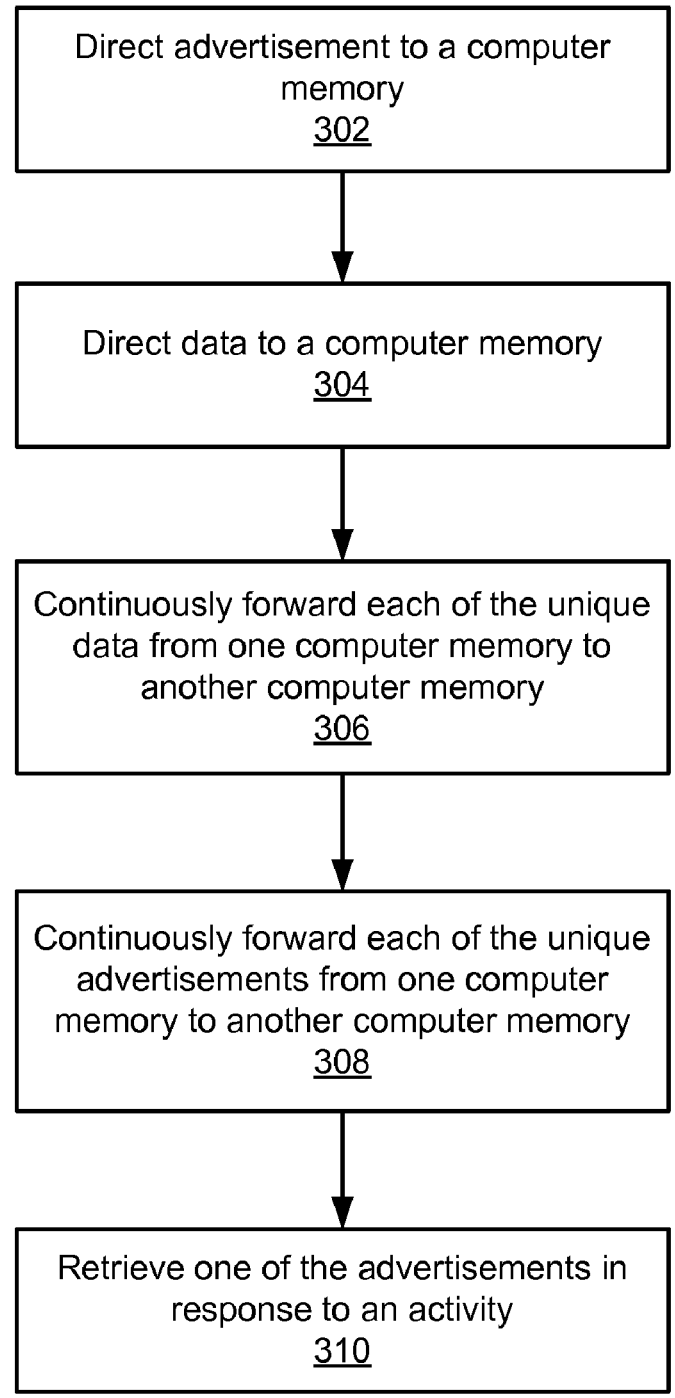
FIG. 6 is a flow diagram of a process.

As shown in FIG. 6, data forwarding process 300 includes receiving (302) a request to store or retrieve data. If the received request is a request to store data, data forwarding process 300 determines (304) a memory location associated with an IP address available to receive the data.

Process 300 sends (306) a message with the memory location associated with the IP address for the requester to forward the data.

Process 300 detects (308) the presence of data in a memory location. Process 300 forwards (310) the data in the memory location to another memory location associated with another IP address within the computer and continues to repeat detecting (308) and forwarding (310) of the data from memory location associated with one IP address to a memory location associated with another IP address.

If the received request is a request to retrieve data being continuously forwarded from memory location to memory location, data forwarding process 300 locates (312) the requested data being forwarded within the memory and returns (314) the located data to the requester.

Thus, memory associated with multiple IP addresses within a single system creates data storage without caching, downloading and/or storing the data on any physical storage medium. Data storage and management is accomplished via a continuous routing of the data from memory location associated with one IP address to memory location associated with another IP address.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
in a computer system having multiple network addresses associated with respective memory locations, receiving a request to store at least one data item;
directing the at least one data item to a first network address associated with a first memory location that is configured to receive the at least one data item; and
forwarding the at least one data item between memory locations in the computer system without storing the forwarded at least one data item on any fixed storage medium in the computer system, the forwarding comprising:
detecting a presence of the at least one data item at a memory location associated with a specific network address; and
forwarding the at least one data item between multiple memory locations associated with respective network addresses in the computer system without storing the forwarded at least one data item on any fixed storage medium, wherein network addresses to which the at least one data items are forwarded are determined dynamically based at least on statuses of respective memory locations.

2. The method of claim 1, wherein the computer system comprises a network interface that is responsive to requests for at least two of the multiple network addresses.

3. The method of claim 1, further comprising:
in response to receiving an indication of an imminent power loss to the computer system, forwarding the at least one data item to a memory of another computer system in communication with the computer system via one or more networks.

4. The method of claim 1, wherein the computer system comprises a single computing device.

5. The method of claim 1, wherein the computer system comprises two or more computing devices.

6. The method of claim 1, wherein the multiple network addresses comprise Internet Protocol (IP) addresses.

7. The method of claim 1 further comprising:
receiving a request to retrieve a particular data item being forwarded in the computer system; and
retrieving the particular data item from a memory location associated with one of the network addresses.

8. The method of claim 7, wherein retrieving comprises:
comparing a hash mark associated with the particular data item to respective hash marks of data items entering memory locations of the computer system in order to identify a particular memory location storing the particular data item; and
forwarding the particular data item from the particular memory location to a requester.

9. A non-signal computer readable medium having instruction stored thereon, wherein the instructions are readable by a computing system having multiple network addresses associated with respective memory locations in order to cause the computing system to perform operations comprising:
receiving a request to store a data item;
directing the data item to a first network address associated with a first memory location;
forwarding the data item between memory addresses of the computing system without storing the data item on any fixed storage medium in the computing system, wherein respective memory addresses to which the data item is forwarded are determined dynamically based at least on statuses of respective memory locations; and
in response to receiving a request to retrieve the data item, retrieving the data item from a particular memory location of the computer system that stores the data item at the time of retrieving.

10. The non-signal computer readable medium of claim 9, wherein the computing system comprises a network interface that is responsive to requests for at least two of the multiple network addresses.

11. The non-signal computer readable medium of claim 9, wherein the operations further comprise:
in response to receiving an indication of an imminent power loss to the computing system, forwarding the data item to a memory of another computing device in communication with the computing system via one or more networks.

12. The non-signal computer readable medium of claim 9, wherein the computing system comprises a single computing device.

13. The non-signal computer readable medium of claim 9, wherein the multiple network addresses comprise Internet Protocol (IP) addresses.

14. The non-signal computer readable medium of claim 9, wherein retrieving the data item comprises:
comparing a hash mark associated with the data item to respective hash marks of data items entering memory locations of the computing system in order to identify the particular memory location storing the data item.

15. A computing system comprising:
one or more hardware processors;
one or more memory devices comprising a plurality of memory locations associated with respective network addresses;
a computer readable medium storing instructions configured for execution by the one or more processors in order to cause the computing system to perform operations comprising:

receiving a request to store a data item;

directing the data item to one of the plurality of network addresses associated with one or the plurality of memory locations within the one or more memory devices;

forwarding the data item between respective memory addresses of the computing system without storing the data item on any fixed storage medium in the computing system, wherein respective network addresses to which the data item is forwarded are determined dynamically based at least on statuses of respective memory locations; and in response to receiving a request to retrieve the data item, retrieving the data item from a particular memory location of the computing system that stores the data item at the time of retrieving.

16. The computing system of claim 15, wherein the computing system comprises a network interface that is responsive to requests for at least two of the plurality of network address.

17. The computing system of claim 15, wherein the operations further comprise:

in response to receiving an indication of an imminent power loss to the computing system, forwarding the data item to a memory of another computing device in communication with the computing system via one or more networks.

18. The computing system of claim 15, wherein the computing system comprises a single computing device.

19. The computing system of claim 15, wherein the plurality of network addresses comprise Internet Protocol (IP) addresses.

20. The computing system of claim 15, wherein retrieving the data item comprises:

comparing a hash mark associated with the data item to respective hash marks of data items entering memory locations of the computing system in order to identify the particular memory location storing the data item.

* * * * *

UNITED STATES PATENT AND TRADEMARK OFFICE
CERTIFICATE OF CORRECTION

PATENT NO. : 8,356,078 B2
APPLICATION NO. : 13/057072
DATED : January 15, 2013
INVENTOR(S) : Fein et al.

Page 1 of 1

It is certified that error appears in the above-identified patent and that said Letters Patent is hereby corrected as shown below:

On the Title Page

On Page 3, Item (56), under "OTHER PUBLICATIONS", in Column 1, Line 17, delete "Oct. 2011-7000703," and insert -- 10-2011-7000703, --, therefor.

On Page 3, in Item (56), under "OTHER PUBLICATIONS", in Column 2, Lines 40-41, delete "3535-3531," and insert -- 3525-3531, --, therefor.

In the Specification

In Column 3, Line 47, delete "Sill," and insert -- Still, --, therefor.

Signed and Sealed this
Eleventh Day of March, 2014

Michelle K. Lee
*Deputy Director of the United States Patent and Trademark Office*